United States Patent

[11] 3,587,563

[72] Inventor Charles W. Ragsdale
 Takoma Park, Md.
[21] Appl. No. 789,694
[22] Filed Jan. 8, 1969
[45] Patented June 28, 1971
[73] Assignee The United States of America as represented by the Secretary of the Army

[54] HEARTBEAT MONITOR
 11 Claims, 31 Drawing Figs.
[52] U.S. Cl. .................................................. 128/2.06A
[51] Int. Cl. .................................................. A61b 5/04
[50] Field of Search .......................................... 128/2.06, 2.05

[56] References Cited
 UNITED STATES PATENTS
 3,144,019 8/1964 Haber .......................... 128/2.06
 3,156,235 11/1964 Jaeger ......................... 128/2.06X
 3,267,934 8/1966 Thornton .................... 128/2.06

3,352,300 11/1967 Rose .......................... 128/2.06

Primary Examiner—William E. Kamm
Attorneys—Harry M. Saragovitz, Edward J. Kelly, Herbert Berl and J. D. Edgerton ABSTRACT: Disclosed is an electronic heart monitor for monitoring electrocardiograph waveforms of a human heart. The unit is lightweight, battery operated, and usable over a wide temperature range so as to satisfy military requirements. It indicates high and low heart rates, fibrillation, arrest, excess noise, average heart rate and low battery potential, all in a manner requiring no extensive interpretation by trained personnel. The heartbeat monitor comprises input terminals for coupling to a source of electrocardiogram waves, and alarm, and a fibrillation sensing circuit for coupling the input terminals to the alarm such that the alarm is actuated by the sensing circuit whenever a fibrillation waveform is applied to the input terminals. The fibrillation sensing circuit comprises means for sensing the duty cycle of an electrocardiogram wave expending beyond predetermined maximum and minimum values.

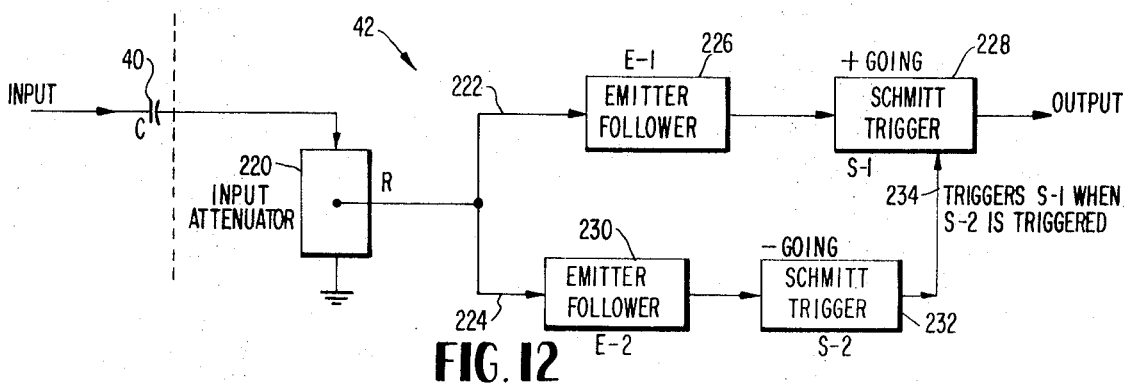
FIG.12
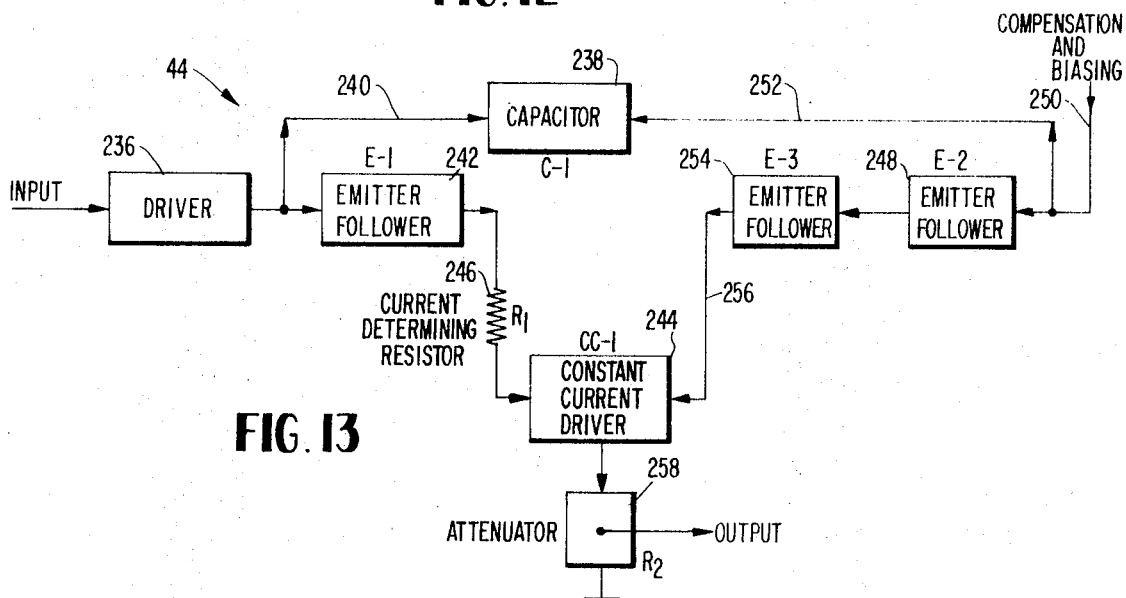
FIG.13
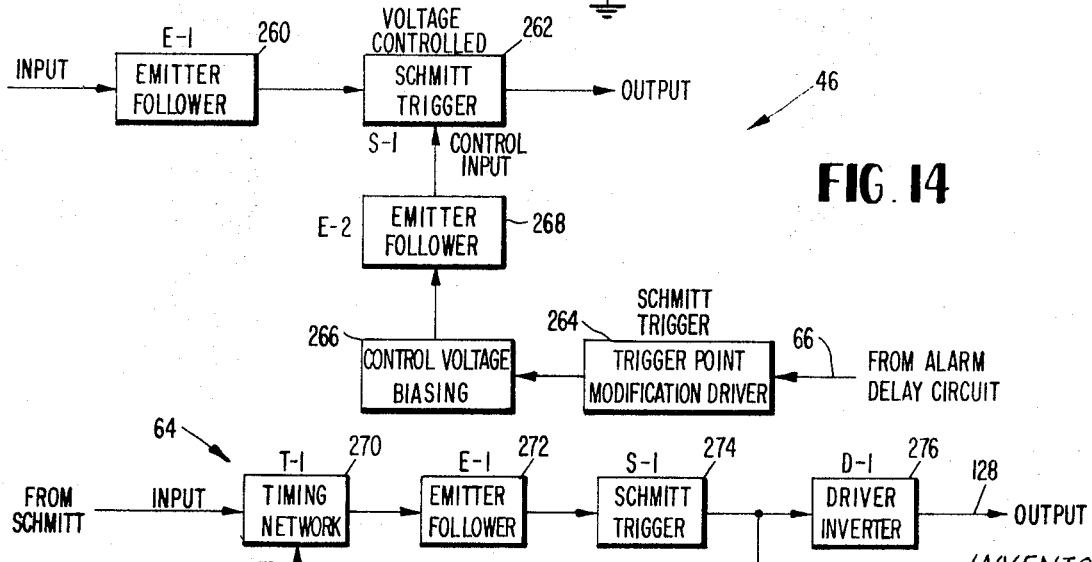
FIG.14
FIG.15
INVENTOR,
Charles W. Ragsdale
By: Harry M. Saragovitz,
Edward J. Kelly &
J. D. Edgerton ATTORNEYS.

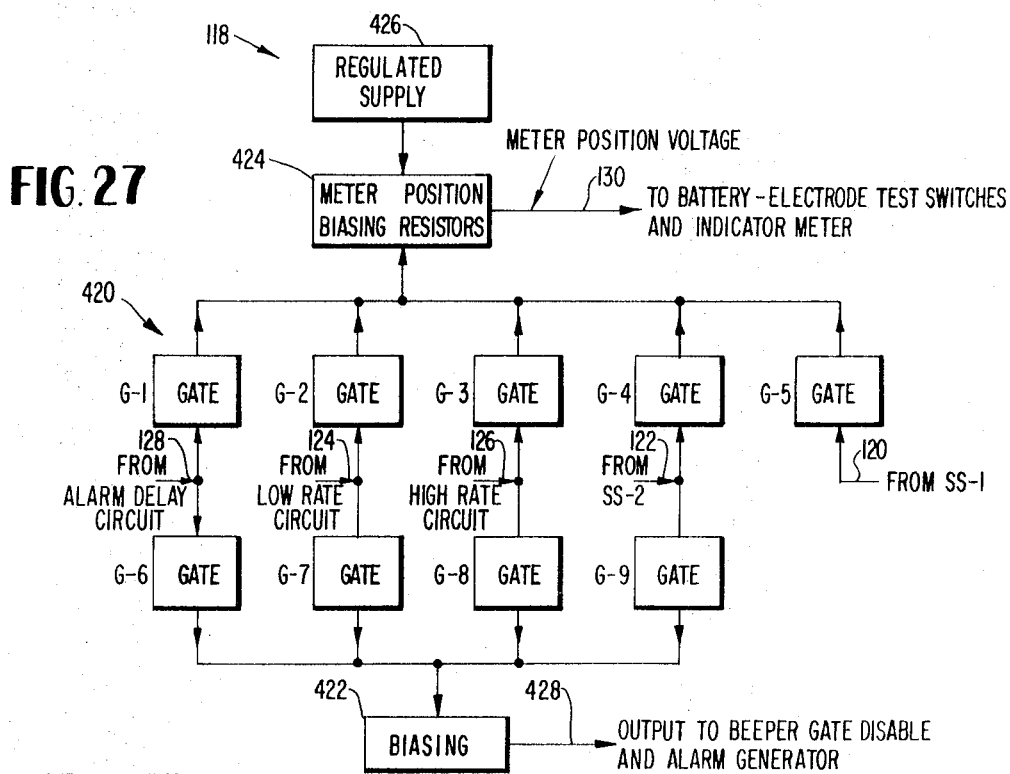
FIG. 27
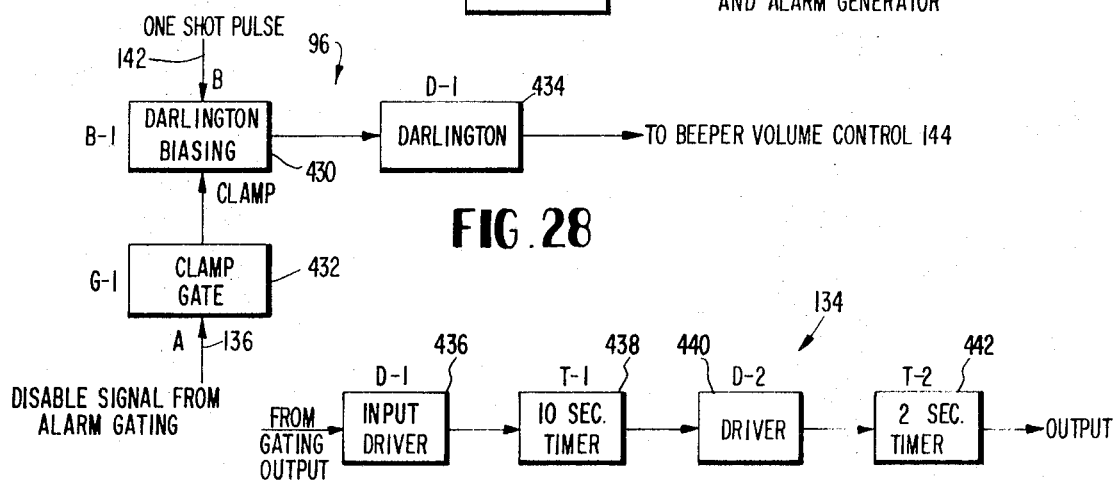
FIG. 28
FIG. 29
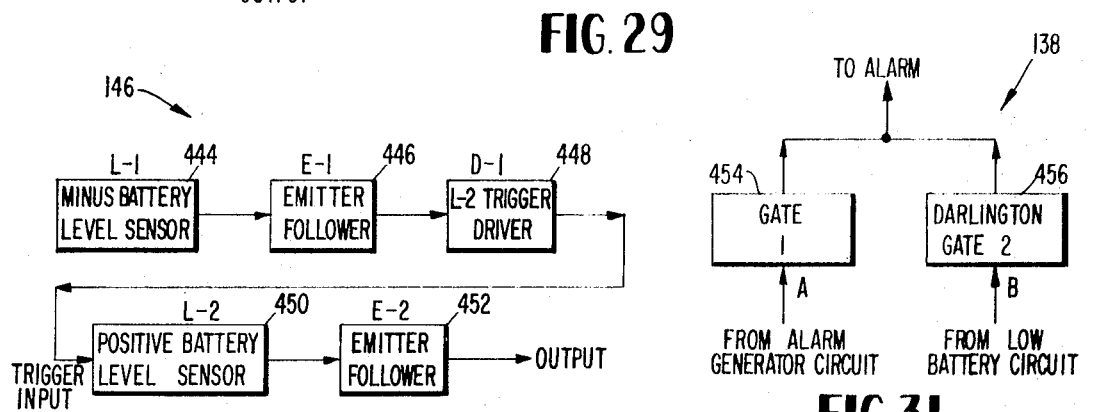
FIG. 30
FIG. 31

HEARTBEAT MONITOR

This invention relates to an electronic device for monitoring a human heart and more particularly to a heart monitor especially suited for military use in field hospitals and the like. More particularly, the device of the present invention senses a patient's electrocardiogram and gives an alarm if cardiac arrest occurs or the pulse rate is not within specified limits. It also indicates the kind of cardiac arrest occurring (fibrillation or standstill) since the resuscitative techniques for each type of arrest differ. In addition, the monitor is portable, operates on batteries, and meets military environmental standards by operating over a −40° to +130° F. temperature range. It is especially designed for field use and other situations in which oscilloscopes and paper writers are not available or their use is not feasible.

Conventional heart monitors available and used in a large number of hospitals basically measure heart rate and give an alarm if the rate goes outside two settable rate limits. Hence, those monitors indicate that the situation has changed and usually rely upon an oscilloscope and trained personnel for a decision as to the significance of the change. No heart monitor of which applicant is aware indicates that ventricular fibrillation is present. In addition, commercial monitors are greatly affected by noise (60 Hz., 120 Hz., potentials produced by the patient's muscles, and other artifacts) and tend to make a false high rate indication when such noise is present. Also, most of these monitors require a manual adjustment of gain control to compensate for signal amplitude changes. Finally, these commercial monitors are not designed for long term battery operation nor do they meet military environmental standards and requirements.

The device of the present invention avoids the above and other disadvantages by providing a fully portable and battery operated unit particularly suited for use by the military under field conditions. An important feature of the present invention includes circuitry for distinguishing ventricular fibrillation from other ECG (electrocardiogram) waveforms. Ventricular fibrillation is a form of cardiac arrest where effective pumping action has ceased but the heart is still contracting, though inefficiently and incoordinately. Fibrillation is electrically characterized by a very erratic but somewhat sinusoidal signal. Cardiac standstill is basically the absence of heart contraction and is electrically characterized by an absence of signal (except for noise). However, since the heart is quite likely not pumping adequately with a nonzero heart rate, standstill (called arrest) is defined for the purposes of the present invention as a heart rate below 20 beats per minute. Nonarrest ECG waveforms can run the gamut of waveshapes, including some very similar to fibrillation.

Other important features of the present invention include a meter readout for both high and low rates, an indication of noise, and an indication of both types of arrest, i.e., fibrillation and standstill. The unit of the present invention sounds an alarm at maximum volume if any of the above states occur, includes provision for battery testing, and sounds a tone if the batteries need recharging or replacing. It is capable of operating over seven days continuously on batteries and allows a large amount of noise riding upon the signal without giving a false rate information. The unit of the present invention also sounds an alarm if the noise becomes too great, such as might be produced by an open lead.

It is therefore one object of the present invention to provide an improved electronic monitor for sensing the electrocardiogram of a human heart.

Another object of the present invention is to provide a lightweight economical hear monitor.

Another object of the present invention is to provide a heart monitor which in addition to other indications provides an alarm when the heart undergoes ventricular fibrillation.

Another object of the present invention is to provide a heart monitor particularly suited for military use and one which fully meets military environmental standards, including operating over a −40° to +130° F. temperature range.

Another object of the present invention is to provide a heart monitor particularly adapted for use in field hospitals and other situations where oscilloscopes and paper writers are not available or their use is not feasible.

These and further objects and advantages of the invention will be more apparent upon reference to the following specification, claims, and appended drawings, wherein:

FIG. 1 is an overall block diagram of the electronic heart monitor of the present invention;
FIG. 2 is a diagram showing a filtered nonarrest electrocardiogram;
FIG. 3 is a diagram showing a typical electrocardiogram for ventricular fibrillation;
FIG. 4 is a waveform diagram showing the operation of the digital filter forming a part of the monitor of the present invention;
FIG. 5 is a diagram illustrating the operation of the filter under noise conditions;
FIG. 6 is a block diagram of the battery-electrode test circuit forming a part of the monitor of FIG. 1;
FIG. 7 is a block diagram of the monitor preamplifier;
FIG. 8 is a block diagram of the monitor full wave rectifier;
FIG. 9 is a block diagram of the AGC circuit forming a part of the monitor of FIG. 1;
FIG. 10 is a block diagram of the AGC dump;
FIG. 11 is a block diagram of the monitor fibrillation filter;
FIG. 12 is a block diagram of the monitor T-schmitt trigger;
FIG. 13 is a block diagram of the duty cycle measuring circuit;
FIG. 14 is a block diagram of a duty cycle sensing schmitt;
FIG. 15 is a block diagram of the alarm delay circuit;
FIG. 16 is a block diagram of the erraticity circuit;
FIG. 17 is a block diagram of the 5.0 volt schmitt of FIG. 1;
FIG. 18 is a block diagram of a 3.0 volt schmitt;
FIG. 19 is a block diagram of the digital filter of FIG. 1;
FIG. 20 is a diagram of the one shot circuit of FIG. 1;
FIG. 21 is a block diagram of the driver;
FIG. 22 is a block diagram of the rate measuring circuit;
FIG. 23 is a block diagram of the high rate sensor;
FIG. 24 is a block diagram of the low rate sensor;
FIG. 25 is a block diagram of the standstill circuit of FIG. 1;
FIG. 26 is a block diagram of the second standstill circuit (standstill circuit 2) of FIG. 1;
FIG. 27 is a block diagram of the alarm gating circuit of FIG. 1;
FIG. 28 is a block diagram of the beeper gate;
FIG. 29 is a block diagram of the alarm generator;
FIG. 30 is a block diagram of the low battery circuit; and
FIG. 31 is a block diagram of the alarm OR gates of FIG. 1.

GENERAL DESCRIPTION

Referring to the drawings, the novel heart monitor of the present invention is generally indicated at 10 in FIG. 1. Referring to FIG. 1, an input to the monitor is derived from a pair of conventional electrocardiogram electrodes and applied to the monitor input terminals 12, 14, and 16, one of which may be connected to a ground as indicated in the drawing. The input terminals 12 and 14 are applied to a battery-electrode test circuit 18 for a purpose more fully described below. The test circuit feeds a signal by way of lead 20 to a meter indicator 22.

The ECG, acquired by electrodes attached to the patient in any one of many possible conventional configurations, is routed through the test circuit 18 to a preamplifier 24. Preamplifier 24 provides a gain from 1 K. to 50 K. adjustable by a control voltage applied to a field effect transistor. It also provides band pass filtering with one-half power points at 3.6 Hz. and 76 Hz. and approximately 60 db./decade rolloff above and below those points. It has a differential input and an input impedance greater than 50 K. ohms. Input protection is provided for each input of ±3,000 volts as protection against a defibrillator pulse. The output impedance of the preamplifier is 24K.

The preamplifier 24 passes the important frequencies of the ECG (QRS complex, fibrillation) while offering some rejection of high frequency noise (muscle potentials at 100 Hz. or greater, 120 Hz., etc.) and low frequency ECG components (DC electrode voltage, S–T segment shifts, etc.). The differential input rejects much of the in phase signals (such as as 60 Hz. generated external to the body) and provides a high enough input impedance for use with most electrodes.

The output of the preamplifier 24 is applied to a full wave rectifier 26 in FIG. 1 so that the circuitry following the rectifier output will not be affected by monitor input signal polarity changes.

From the full wave rectifier the signal is applied to an automatic gain control circuit 28 which feeds back a gain control signal by way of lead 30 to preamplifier 24. AGC circuit 28 originally applies a control voltage to the preamplifier 24 that gives a maximum preamplifier gain. When the full wave rectifier output is greater than the AGC control point (6.0 volts), the AGC output voltage linearly decreases with time, to decrease preamp gain, until the rectifier output is below the 6.0 volt level. The maximum gain decrease time is 0.5 seconds. The AGC output voltage then linearly increases with time (increasing preamp gain) until the rectifier output is above the 6.0 volt level again. The maximum gain increase time is 15 seconds.

The AGC output acts with the full wave rectifier 26 to keep the peak preamp signal amplitude at 6.0 volts. Because of the capacitive coupling of the full wave rectifier, the AGC and the rectifier act to DC shift the signal and affect its amplitude, giving equal positive and negative peaks at the preamp outlet, after equilibrium is reached. Because of the slow reaction time of the AGC, only long term amplitude changes are completely adjusted for.

Preamplifier 24 feeds a signal to an AGC dump 32 having its output coupled by way of line 34 to AGC circuit 28. The AGC dump circuit senses the ECG (before AGC control) in the preamplifier 24 and resets the AGC to give preamp maximum gain 2 seconds after a preamp input signal of more than 5 millivolt peak (either polarity) is removed. The latter condition would exist during defibrillation, during cauterization (as in the operation room) or because of 60 Hz. pickup due to an open ECG lead (or leads).

The output from preamplifier 24 is applied by way of lead 36 to a four-section low-pass fibrillation filter 38 in the fibrillation sensing circuitry. Fibrillation is a very erratic somewhat sinusoidal signal with a repetition rate varying between 200 and 500 pulses per minute. Filter 38 has a one-half power point at 15 Hz. and approximately 80 db./decade rolloff. The filter passes the fibrillation frequencies of interest while greatly attenuating high frequency signals (such as 60 Hz., 120 Hz., and muscle potentials). In addition, the rapid rolloff allows the selection of a higher one-half power point (while still having good noise attenuation) so that fibrillation signals will be attenuated less.

The signal passes from filter 38 through a coupling capacitor 40 to a T-schmitt trigger 42. The capacitor coupling shifts the filter output according to the average value of the signal. The time constant is 1.0 seconds. The T-schmitt triggers on either input signal polarity when the filter output exceeds +1.5 or −1.5 volts. Hence, the filtered and shifted ECG is converted to a train of pulses. An average duty cycle measuring circuit 44 follows and this circuit gives a level output depending on the average duty cycle of the T-schmitt pulses.

From the duty cycle measuring circuit 44, the signal is applied to a duty cycle sensing schmitt 46 which changes state when a duty cycle measuring circuit output from circuit 44 exceeds a value equivalent to approximately 52 percent duty cycle.

Fibrillation sensing can be described as follows: The fibrillation filter 38 acts with the preamp filter of preamplifier 24 to limit the T-schmitt input to a 3.6 Hz. to 15 Hz. frequency band. A window is established by the T-schmitt. Average duty cycle is defined as the time related to the period that the signal is outside the window. Much of the nonarrest waveforms are attenuated by the filter so that usually, most of the T-schmitt input signal is inside the window giving a low duty cycle indication. Even if a large nonarrest signal appears at the filter output, nonarrest signals usually have large average DC values. Hence, the signal would be shifted so that more of the signal is within the window, thereby decreasing the average duty cycle. This is illustrated in FIG. 2 which shows a typical filtered nonarrest electrocardiogram indicated by the waveform 48 in FIG. 2. The window is indicated by the plus 1.5 v. line 50 and the minus 1.5 v. line 52. That portion of the electrocardiogram outside the window is indicated as $T_1$ at 54 whereas the period of the repetitive signal is indicated as $\gamma$ at 56. The duty cycle is defined as $T_1/\gamma$.

FIG. 3 shows an electrocardiogram waveform at 58 which is representative of a typical fibrillation signal. Plus 6.0 volts is indicated by the dash line 60 and minus 6.0 volts is indicated by the dash line 62 in FIG. 3. These fibrillation signals are passed by the filter and are not shifted because the average value is essentially zero. Since the fibrillation waveform 58 is outside the window defined by lines 50 and 52 in FIG. 3 for a long period of time, a large duty cycle is sensed.

When the duty cycle sensing schmitt 46 changes state, an alarm delay circuit 64 is enabled. A signal from the output of alarm delay circuit 64 is fed back by way of lead 66 to sensing schmitt 46. That is, the alarm delay output changes state providing the duty cycle schmitt 46 triggered for at least 5.0 seconds. The delay allows for circuit adjustment to signal changes and prevents an indication of fibrillation when short runs of fibrillationlike nonarrest signals occur. After the output of alarm delay circuit 64 changes state, a 6.5 second delay exists after fibrillation conditions cease to exist before fibrillation is no longer indicated. The latter allows for erratic fibrillation signals which can sometimes disappear for short periods of time.

When the alarm delay circuit 64 changes to a fibrillation indication, the feedback signal on 66 causes the duty cycle trip point of sensing schmitt 46 to be lowered to a 46 percent duty cycle. This adds controlled hysteresis so that a more erratic fibrillation waveform (as usually occurs with time) resulting in a decreased duty cycle will still be properly indicated.

An erraticity circuit 68 has its output connected by way of lead 70 to alarm delay circuit 64. Circuit 68 acts to reset the alarm delay circuit if the ECG signal is not erratic enough. An erratic signal is one for which the distance between pulses is not less than 400 milliseconds for a 4.0 second interval. The latter applies to fibrillation waveforms that have been observed, and also nonarrest rates below 150 beats per minute. Rates above 150 beats per minute for longer than 4.0 seconds reset the alarm delay circuit. The latter reduces the chance that high rate, sinusoidal, nonerratic signals such as a ventricular tachycardia (a waveform very similar to ventricular fibrillation) will be indicated as fibrillation.

The output of full wave rectifier 26 is supplied by lead 72 to a 5.0 volt schmitt 74 and a 3.0 volt schmitt 76. These, in turn, feed the two inputs of a digital filter 78. The digital filter is actually a pulse width discriminator and performs the following three functions.

First, the digital filter does not provide an output if the 5.0 volt schmitt output is zero or the 3.0 volt schmitt output pulse width is less than 10 milliseconds. If either of the latter conditions are met, the circuit is also reset. The latter conditions are met with excess muscle potentials, 60 Hz. and 120 Hz.

Secondly, the digital filter does provide an output if there is a 5.0 volt schmitt output along with a 10 to 35 millisecond 3.0 volt schmitt pulse width. If these conditions exist, for 400 milliseconds (refractory period) after the 10—35 millisecond pulse, 3.0 volt schmitt pulses greater than 35 milliseconds are rejected.

Thirdly, digital filter 78 provides an output if there is a 5.0 volt schmitt output along with a greater than 30 milliseconds 3.0 volt schmitt pulse width. No refractory period then exists.

The first condition or case 1 above applies when either pure 60 Hz., or 120 Hz. is received (as with an open lead) or when excessive noise is riding on the ECG (such as 60 Hz., 120 Hz., and muscle potentials). These noise artifacts have widths less than 10 milliseconds, while ECG signals have wider widths.

Condition or case 2 above applies and is useful when a narrow width QRS complex accompanied with a large amplitude, long latency T-wave occurs. Such a waveform is illustrated at 80 in FIG. 4. The QRS complex is indicated at 82 and the long latency T-wave at 84. The refractory period or 400 millisecond period is indicated at 86. In waveform 80 the T-wave 84 is rejected by the digital filter 78.

Condition or case 3 above applies when most other QRS complexes are received. In both cases 2 and 3 a considerable amount of noise is tolerated riding upon the signal. FIG. 5 shows a full wave rectified ECG at 88 with noise superimposed on it as indicated at 90. In the signal shown in FIG. 5 the noise spikes 90 are rejected when case or condition 1 above is met. Noise riding on the signal itself still allows the meeting of condition 2 or 3 with the proper pulse width. Only when the signal is so completely obscured by noise that the ECG signal peak is driven too far below the 3.0 volt schmitt threshold does a zero digital filter output exist.

Digital filter 78 feeds a one shot 92. That is, the digital filter triggers the one shot which emits constant width pulses. In addition, during the one shot pulse, additional filter outputs will have no effect. Hence, signals (such as the typical T-wave) that are not rejected by the filter are blanked out by the one shot. The one shot width is the maximum to still allow a 225 beat per minute maximum rate. The output from the one shot triggers the erraticity circuit 68 previously described, a driver 94 and a beeper gate 96 more fully described below. If a disable signal is not present from the alarm delay circuit 64 (during fibrillation), the one shot pulse is applied to a rate measuring circuit 98. During fibrillation, no pulses are applied to the rate measuring circuit 98 so that the pointer on the cardiotachometer 100 connected to the output of rate measuring circuit 98 falls toward zero. The output of the rate measuring circuit is a DC level linearly dependent upon the rate of occurrence of the one shot pulse. The cardiotachometer 100 indicates the rate, and the rate signal is applied to a high rate sensor 102 and a low rate sensor 104. The high rate sensor and the low rate sensor outputs change state when their input voltage falls above or below the threshold set by the high rate limit 106 and the low rate limit 108 respectively. These limits may be reference voltage sources which are set to previously determined values and by way of example only it may take the form of variable resistors to establish the high and low limit comparison voltages which are compared with the output of the rate measuring circuit 98.

Driver 94 also has its output coupled by way of lead 110 to a second standstill circuit 112 labeled SS-2. When fibrillation is not present, the pulses from the driver triggers standstill circuit 112. The circuit remains disabled as long as the one shot pulses occur more frequently than once every 3 seconds (20 beats per minute). If the digital filter output is zero, SS-2 is enabled. A first standstill circuit 114 is connected by lead 116 to the output of a 5.0 volt schmitt 74. Standstill circuit 114, labeled SS-1, remains disabled as long as the 5.0 volt schmitt output pulses occur more frequently than once every three seconds (20 per minute). If the rate is below 20 per minute, SS-1 enables and also enables SS-2. Hence if SS-1 remains disabled indicating a signal present at a rate greater than 20 beats per minute (and SS-2 is enabled and indicating a zero digital filter output), a noise indication is made. If the ECG repetition rate is below 20 beats per minute, both SS-1 and SS-2 are enabled, indicating that cardiac arrest has occurred.

Outputs from SS-1, SS-2, the high rate sensor 102, the low rate sensor 104, and the alarm delay circuit 64 of the fibrillation circuitry are routed to alarm gating 118. The signal to the gating from SS-1 is by way of lead 120, from SS-2 by way of lead 122, from low rate sensor 104 by way of lead 124, from high rate sensor 102 by way of lead 126, and from the fibrillation circuitry by way of lead 128. Gating 118 supplies a level depending on the state existing by way of lead 130 to the indicator meter 22 through the battery-electrode test circuit 18. If any of the alarm gating inputs are enabled, an output from gating 118 is applied by way of lead 132 to alarm generator 134 and by way of lead 136 to beeper gate 96. If an alarm gating output is present on lead 132, alarm generator 134 produces a two second pulse every 10 seconds. The generator output is supplied to the alarm OR gate 138 to pulse an alarm 140 at full volume. If a disable signal is not present from the alarm gating 118, one shot 92 pulses the alarm by way of lead 142 through beeper gate 96 at a volume set by the beeper volume control potentiometer 144. When any alarm condition exists, beeper gate 96 is disabled.

Finally, connected to the alarm OR gate 138 is a low battery circuit 146. If either of the monitor power supplies drops below 9.1 volts, the low battery circuit output changes state to operate the alarm OR gate 138 and sound a continuous tone alarm in alarm 140.

As can be seen, the heart monitor of FIG. 1 incorporates the following ten features and capabilities:

1. Indicates by meter readout:
   a. High rate (set by a continuously adjustable high rate limit)
   b. Low rate (set by a continuously adjustable low rate limit)
   c. Noise is present
   d. Cardiac arrest (ECG amplitude is below 100 microvolts peak and/or rate is below 20 beats per minute)
   e. Ventricular fibrillation
2. Sounds an alarm at maximum volume if any of the above states 1–a through 1–e occur, the alarm being a 2 second tone repeated every 10 seconds.
3. Beeps (at an adjustable volume) with each nonalarm state heart rate.
4. Provides an electrode-battery test feature by means of two test switches.
5. Automatically sounds a continuous tone alarm (at full volume) if the batteries need recharging or replacing.
6. Indicates the average heart rate on a meter.
7. Operates over seven days continuously on zinc carbon batteries (at 70° F.), over six days continuously on one recharging of N1CAD batteries.
8. Automatically follows signal amplitude changes from 0.1 millivolt to 5 millivolt peak.
9. Resets circuitry within two seconds after receiving a greater than 5 millivolt peak signal such as would be experienced by defibrillation, electric cauterization, or 60 Hz. (from open electrodes).
10. Allows a large amount of noise (60 Hz., 120 Hz., muscle potentials) riding upon the signal without giving false rate information. If the noise is too great (as might be produced by an open lead), the signal is rejected and a noise indication is made. The electrodes should then be checked. The noise indication removes the ambiguity present when excess noise gives a high rate indication. Also, if arrest (standstill) occurs (usually an absence of signal), excess noise will be indicated as such and not as a high rate. The alarm sounds and vital signs can be observed if the cause of the excess noise is not immediately ascertained.

DETAILED DESCRIPTION

Figure 1:
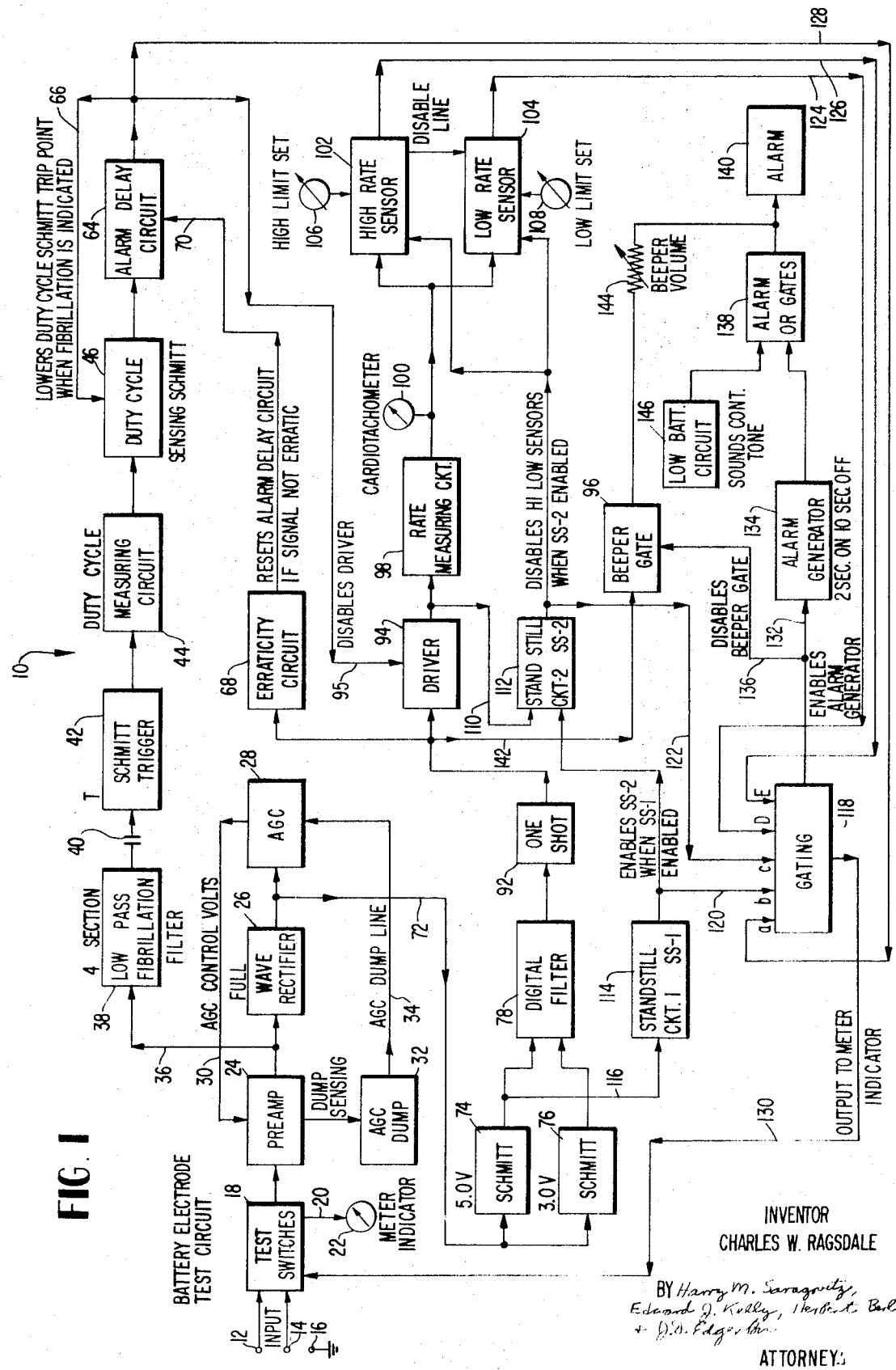
Figure 2:
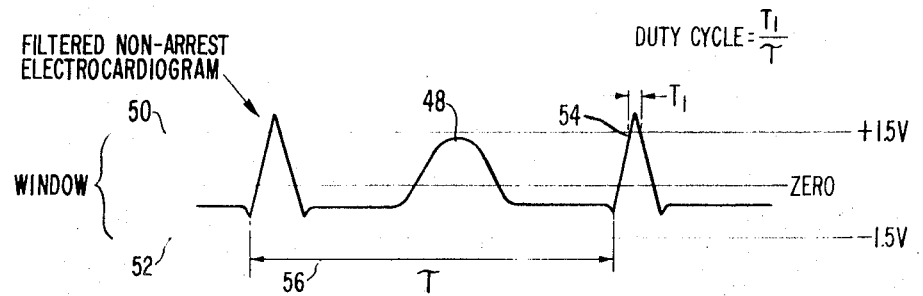
Figure 3:
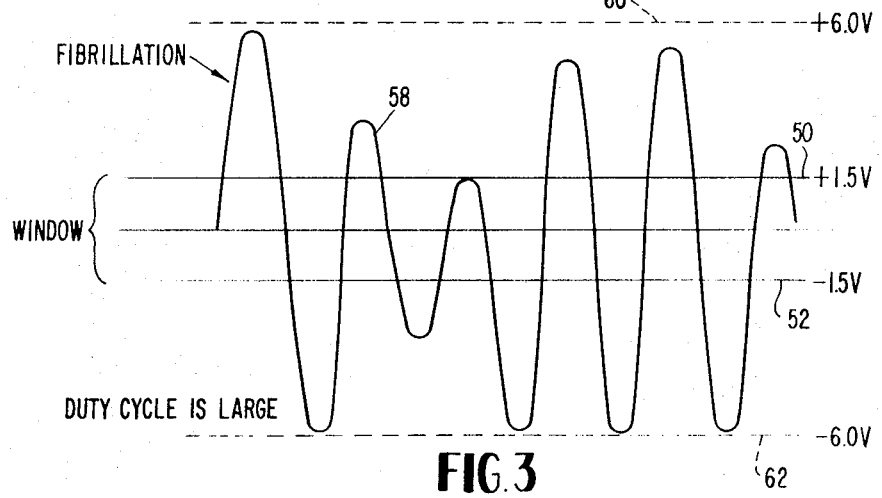
Figure 4:
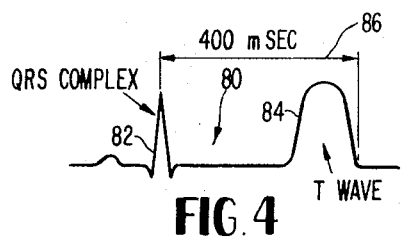
Figure 5:
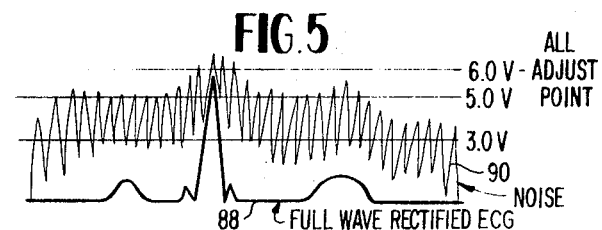

FIGS. 6 through 31 and more detailed block and circuit diagrams of the various components making up the blocks of FIG. 1. In FIGS. 6 through 31 like parts bear like reference numerals.

Figure 6:
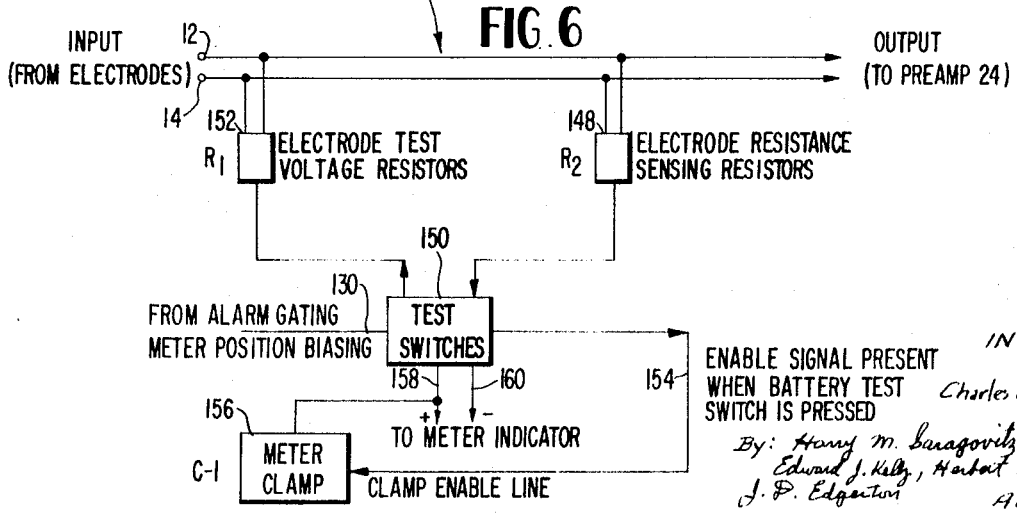

FIG. 6 is a detailed block diagram of the battery-electrode test circuit of FIG. 1. The input from the electrodes to terminals 12 and 14 of test circuit 18 is applied to electrode resistance sensing resistors 148 labeled $R_2$ and pass through these resistors to a pair of test switches 150. Switches 150 are coupled to the input terminals through electrode test voltage resistors 152 labeled $R_1$. An output from test switches 150 is fed by way of lead 154 to the meter clamp 156 labeled C-1 and the output from the clamp is coupled to one of the output leads 158 and 160 to the meter indicator 22 of FIG. 1. When either of the test switches area pressed, an appropriate voltage is applied to the appropriate electrode pair through resistors 152. The meter indicator senses the voltage across the electrode pair, through resistors 148. The meter is also removed from the alarm gating meter position biasing circuit by way of lead 130. When the minus battery test switch is pressed, clamp 156 references the plus terminal of the meter to ground and assures that pressing the other switch will have essentially no effect on the reading. If the electrodes are unplugged, the meter reading corresponds to the battery voltage.

Figure 7:
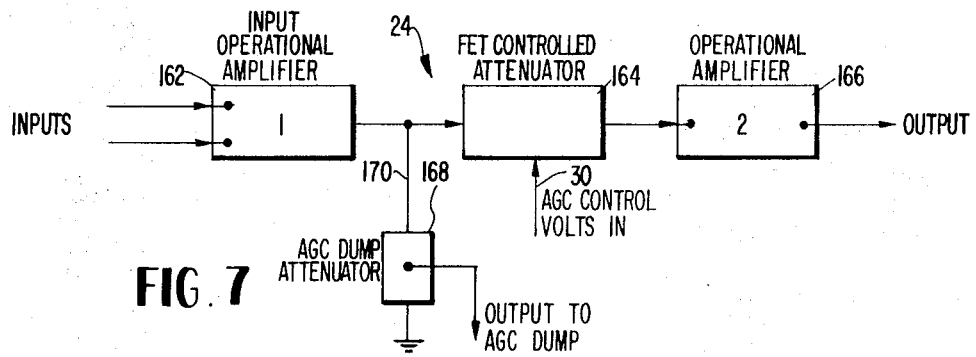

FIG. 7 is a block diagram of the preamplifier 24 of FIG. 1. The input of the preamplifier is connected to an input operation amplifier 162 which in turn feeds a field effect transistor controlled attenuator 164 and an output operational amplifier 166. The output of operation amplifier 162 is connected to an AGC dump attenuator 168 by lead 170. Input operational amplifier 162 provides a gain of 431, a differential input, input protection against ±3,000 volts at each input, a greater than 50 kilohm input impedance, and a double low frequency rolloff, single high frequency rolloff. Output operational amplifier 166 provides a gain of 116, a 24 kilohm output impedance and a single low frequency rolloff, double high frequency rolloff.

Figure 8:
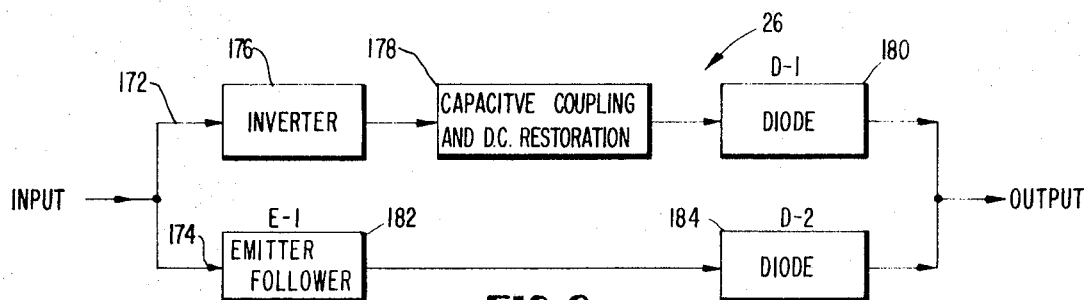

FIG. 8 is a detailed block diagram of the full wave rectifier 26 of FIG. 1. The rectifier comprises a pair of parallel paths 172 and 174. The first path includes an inverter 176, a capacitive coupling and DC restoration circuit 178 and a rectifier diode labeled D-1. The second path includes an emitter follower 182 labeled E-1 and a second rectifier diode 184 labeled D-2. Emitter follower 182 compensates for the voltage drop across diode 184. The capacitive coupling and DC restoration circuit 178 is temperature compensated.

Figure 9:
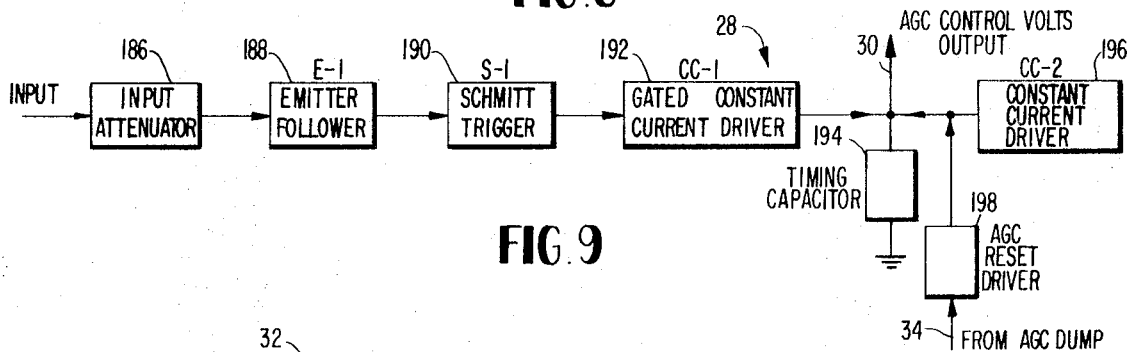

FIG. 9 is a block diagram of the AGC circuit 28 of FIG. 1. The circuit comprises an input attentuator 186 and emitter follower 188, a schmitt trigger 190 and a gated constant current driver 192 labeled CC-1 feeding a timing capacitor 194. Also connected to the timing capacitor is a constant current driver 196 labeled CC-2. The AGC dump line 34 is connected to timing capacitor 194 through an AGC reset driver 198.

When the schmitt trigger 190 is in the ground state, constant current driver 196 acts with the timing capacitor 194 to increase the AGC control voltage linearly with time. The output swing is from ground to plus 4.2 volts with a maximum adjustment time of 15 seconds. When the schmitt circuit 190 is triggered, gated driver 192 counteracts constant current driver 196 to drive the AGC output voltage to ground linearly with time. Maximum adjustment time is 0.5 seconds. When a reset pulse is received from the AGC dump, the AGC reset driver 198 drives the AGC output to plus 4.2 volts (maximum preamplifier gain).

Figure 10:
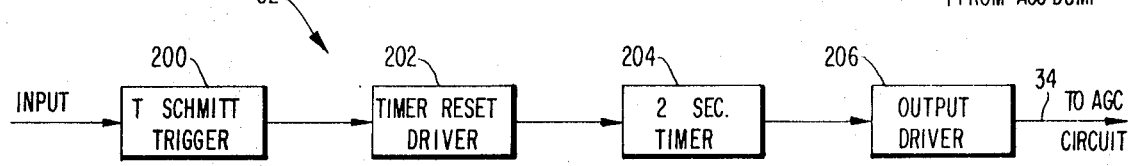

FIG. 10 is a block diagram of the AGC dump 32 of FIG. 1. The circuit comprises a T-schmitt trigger 200, a timer reset driver 202, a 2 second timer 204, and an output driver 206. The T-schmitt trigger triggers on either input signal polarity as previously described in conjunction with the fibrillation T-schmitt trigger. The 2 second timer 204 is held reset by the timer reset driver 202 as long as the T-schmitt is triggered. When the T-schmitt is reset, the timer begins to operate. Two seconds later, the output driver 206 is pulsed to dump the AGC. Timer 204 also operates to dump the AGC 2 seconds after the heart monitor is turned on.

Figure 11:
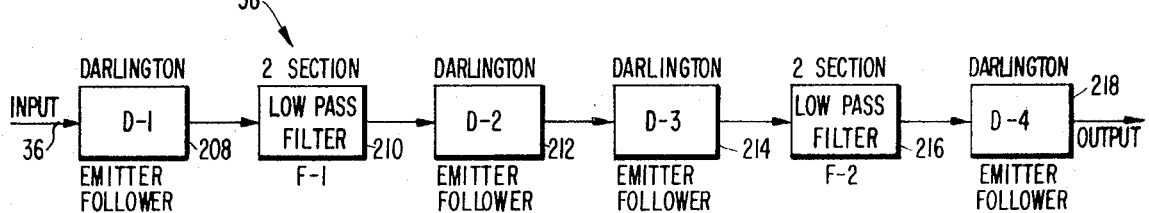

FIG. 11 is a block diagram of the fibrillation filter 38 of FIG. 1. It comprises a darlington emitter follower 208 labeled D-1, a two-section low-pass filter 210 labeled F-1, a pair of additional darlington emitter followers 212 and 214 labeled D-2 and D-3, respectively, a second two-section low-pass filter 216 labeled F-2, and a fourth darlington emitter follower 218 labeled D-4. Emitter follower 208 is complementary to emitter follower 212 and similarly emitter follower 214 is complementary to emitter follower 218. This arrangement compensates for transistor input temperature changes. Filters 210 and 216 act to give a half power point at 15 Hz. and 80 db./decade rolloff.

FIG. 12 is a block diagram of the T-schmitt trigger 42 of FIG. 1. This schmitt trigger is coupled to input capacitor 40 by way of an input attentuator 220. The attenuator feeds a pair of parallel or twin paths 222 and 224, the first comprising an emitter follower 226 and positive going schmitt trigger 228. The second path comprises an emitter follower 230 and negative going schmitt trigger 232. The output of negative going schmitt trigger 232 feeds the positive going schmitt trigger 228 by way of lead 234. Capacitor 40 and attenuator resistor 220 give level shifting with a one second time constant. Whenever the signal is outside the window established by schmitt triggers 228 and 232 of plus 1.5 volt and minus 1.5 volt around zero, the output then changes state. Emitter follower 226 compensates for emitter to base voltage changes of the input transistor to schmitt trigger 228 and emitter follower 230 likewise compensates for emitter-base voltage changes in the input transistor of negative going schmitt trigger 232.

FIG. 13 is a block diagram of the duty cycle measuring circuit 44 of FIG. 1. The duty cycle measuring circuit comprises a driver 236 feeding a capacitor 238 by way of lead 240. The driver also feeds an emitter follower 242, the output of which is connected to a constant current driver 244 by way of a current determining resistor 246. A compensating and biasing source (not shown) is connected to a second emitter follower 248 by way of lead 250 and the source also feeds capacitor 238 over lead 252. A third emitter follower 254 connects the second emitter follower 248 to the other input of the constant current driver 244 by way of lead 256. The driver output is then connected through attenuator resistance 258. Driver 236 provides an output of constant amplitude pulses except for compensation for power supply changes. Capacitor 238 applies essentially the same transient to emitter followers 242 and 248 and charges up to a voltage corresponding to the average duty cycle of the input pulses. Emitter follower 254 compensates for emitter-base voltage changes of the transistor of constant current driver 244. The voltage across capacitor 238 is essentially applied across current determining resistor 246, producing a corresponding current output from driver 244. The driver current flowing in attenuator resistance 258 produces an output voltage proportional to the average duty cycle of the circuit input pulses.

FIG. 14 is a detailed block diagram of the duty cycle sensing schmitt 46 of FIG. 1. It comprises an emitter follower 260 feeding a voltage controlled schmitt trigger 262. The output from the alarm delay 64 of FIG. 1 is fed to the duty cycle sensing schmitt 46 over lead 66 and passes into element 264 which is a schmitt trigger trigger point modification driver. The output of driver 264 is fed to control voltage biasing network 266 which feeds voltage-controlled schmitt trigger 262 through a second emitter follower 268. Emitter follower 268 and the control voltage biasing network 266 act to set the trigger threshold of schmitt trigger 262. Emitter follower 260 compensates for voltage changes of the input transistor of the schmitt trigger. Emitter follower 268 compensates for temperature related forward voltage drop changes in a diode used in the schmitt trigger control input. When the schmitt input rises above threshold value, the output changes state. The trigger point modification driver 264 acts to reduce the schmitt trigger threshold when the alarm delay circuit is enabled.

FIG. 15 is a diagram of the alarm delay gating circuit 64 of FIG. 1. It comprises an input timing network 270 receiving a reset signal over lead 70 from erraticity circuit 68 of FIG. 1. The output of timing network 270 is connected through an emitter follower 272 to a schmitt trigger 274. The schmitt trigger feeds a driver inverter 276 from which the output for lead 128 is derived. The output for driver 94 of FIG. 1 is taken by way of lead 95 from the output of schmitt trigger 274. When the input to timing network 270 changes states, the output of the timing network exponentially rises with a set time constant. When the input to the timing network resets, an exponential fall in the timing network output likewise occurs, but with a longer time constant. The timing network, emitter follower 272, and schmitt trigger 274 act to provide a 5.0 second delay between the time the input to timing network 270 changes state and the output of the schmitt trigger 274 changes state. After the schmitt trigger changes state, approximately a 6.5 second delay exists before the schmitt trigger resets.

Figure 16:
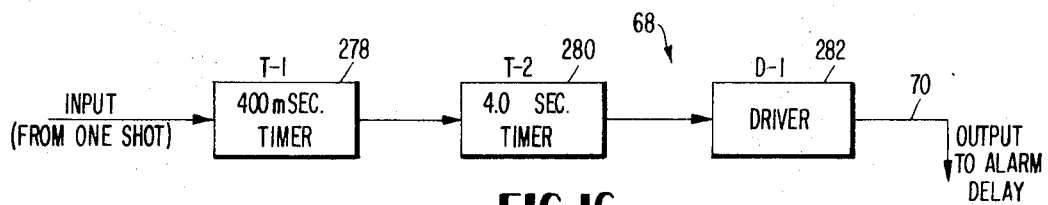

FIG. 16 is a block diagram of the erraticity circuit 68 of FIG. 1. It comprises a 400 millisecond timer 278, a 4.0 second timer 280, and a driver 282. Timer 278 is reset when a positive pulse is received and it changes state (enables) 400 milliseconds later. When timer 278 changes state, timer 280 is reset. Timer 280 changes state 4.0 seconds after timer 278 is reset, providing timer 278 continues to be reset. Therefore, if the time between pulses is less than 400 milliseconds (corresponding to 150 beats per minute or greater rate) existing for more than 4.0 seconds, the circuit output changes state. The first pulse occurring less rapidly than every 400 milliseconds resets the circuit.

Figure 17:
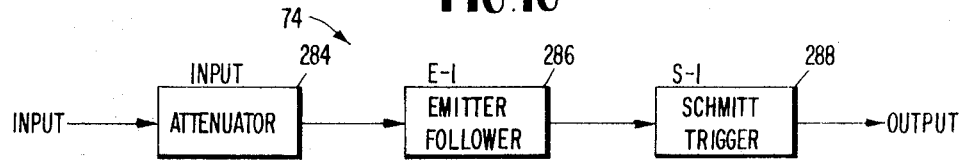
Figure 18:
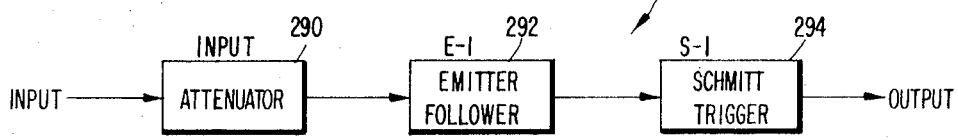

FIGS. 17 and 18 are diagrams of the 5.0 volt schmitt 74 and the 3.0 volt schmitt 76 of FIG. 1, respectively. Schmitt 74 comprises an input attenuator 284, an emitter follower 286 and a schmitt trigger 288. Similarly, 3.0 volt schmitt 76 comprises an input attenuator 290, an emitter follower 292, and a schmitt trigger 294. Emitter follower 286 in FIG. 17 compensates for voltage changes of the input transistor in schmitt trigger 288. The input attenuator 284 adjusts for a 5.0 volt threshold. The 3.0 volt schmitt of FIG. 18 is the same as the 5.0 volt schmitt 74 of FIG. 17 except that the input attenuator 290 adjusts for a 3.0 volt threshold.

Figure 19:
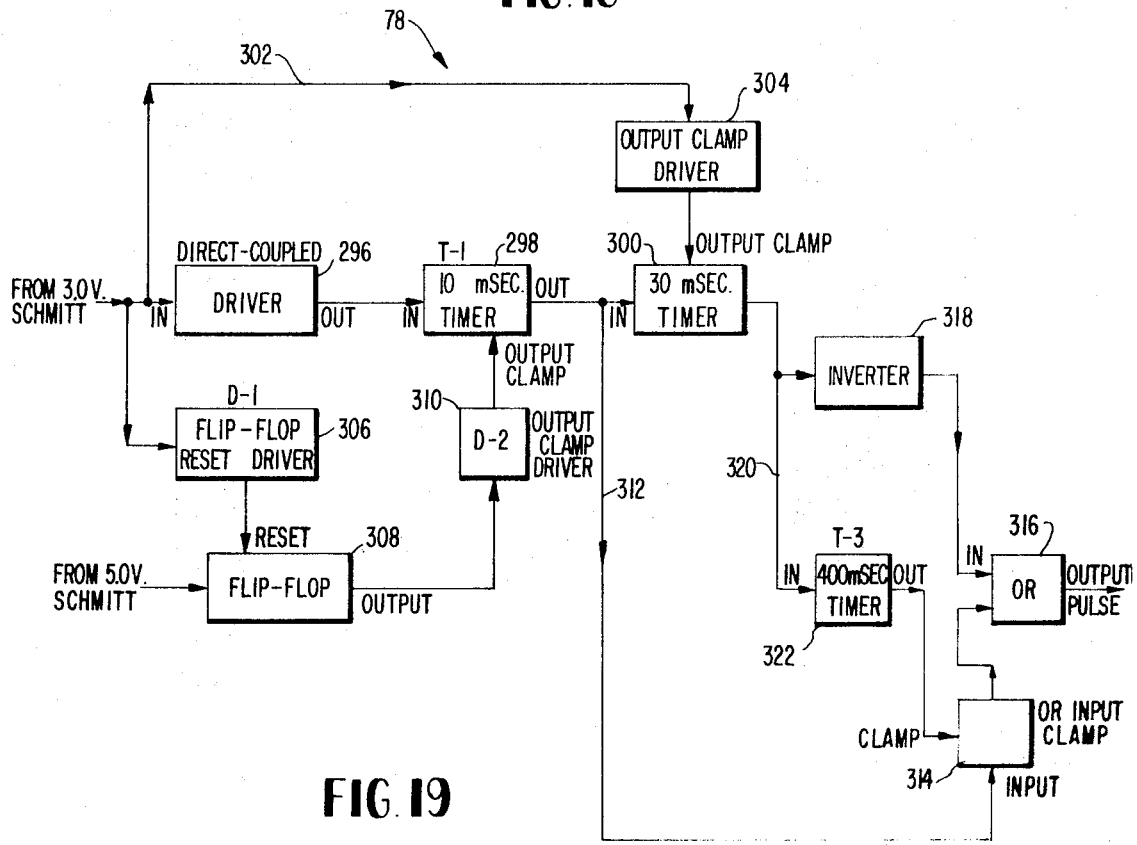

FIG. 19 is a detailed block diagram of the digital filter 78 of FIG. 1. The input from the 3.0 volt schmitt is supplied to a direct coupled driver 296 which feeds a 10 millisecond timer at 298. The output of the 10 millisecond timer is in turn coupled to a 30 millisecond timer at 300. The input from the 3.0 volt schmitt is also fed by way of lead 302 through an output clamp driver 304 to the 30 millisecond time 300. In addition, the input signal is supplied to a flip-flop reset driver 306 supplying a reset signal to a flip-flop 308 having its input connected to receive a signal from the 5.0 volt schmitt. The output of the flip-flop is supplied to the 10 millisecond timer 298 by way of an output clamp driver 3/0. The input of 30 millisecond timer 300 is connected by way of lead 312 to OR input clamp 314 feeding one input of an OR gate 316. The other input of the OR gate is connected to the output of 30 millisecond timer 300 by way of an inverter 318. 30 millisecond timer 300 also feeds a signal by way of lead 320 to a 400 millisecond timer 322 having its output connected to OR input clamp 314.

In operation of the digital filter 78, when the 3.0 volt schmitt is triggered, flip-flop 308 is released (but not triggered) by flip-flop reset driver 306. Concurrently the 10 millisecond timer 298 is released and timing is begun. If, while the 3.0 volt schmitt is triggered, the 5.0 volt schmitt is also triggered, the flip-flop changes state, releasing the clamp through driver 310 on the output of 10 millisecond timer 298. If the 3.0 volt schmitt trigger remains triggered for more than 10 milliseconds, at the end of the 10 millisecond time a positive pulse appears at the output of timer 298. However, if the 3.0 volt schmitt resets before the 10 millisecond is reached, the timer and the flip-flop are reset. No pulse then appears at the output of timer 298.

When a pulse appears at the timer output, the 30 millisecond timer 300 begins to run. Also, timer 298 acts through OR input clamp 314 and the OR gate 316 to provide a digital filter output pulse. The triggered 3.0 volt schmitt acts through driver 304 to clamp the output of timer 300. However, when timer 300 is triggered, a pulse would be seen at the output of this timer if the clamp were removed (which occurs when the 3.0 volts is no longer triggered). Hence, if the 3.0 volt schmitt is less than 30 milliseconds, timer 300 has an output. The output of this timer triggers the 400 millisecond timer 322 which enables the OR input clamp for 400 milliseconds. As a result, only an output from timer 300 can then affect the OR gate output, for a 400 millisecond interval. Schmitt pulses less than 30 milliseconds in width can occur at intervals less than 400 milliseconds and produce a filter output through timer 300. If schmitt pulse widths are greater than 30 milliseconds, after 400 milliseconds timer 322 resets, the output of 10 milliseconds timer 298 affects the OR gate output directly.

Figure 20:
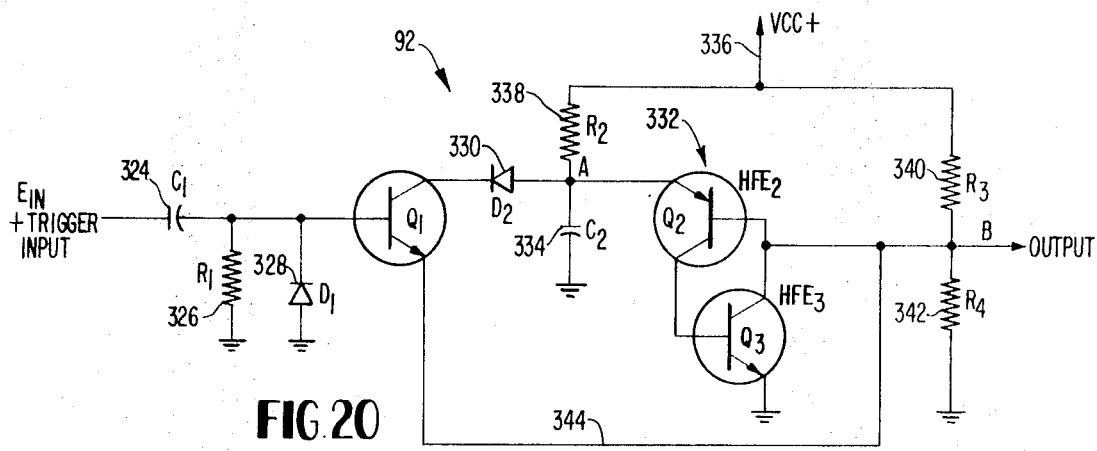

FIG. 20 is a circuit diagram of the one shot 92 of FIG. 1. The circuit comprises an input capacitor 324 labeled C-1 and a shunt resistor 326 labeled $R_1$, the latter in parallel with a rectifier diode 328. The input is fed through a first transistor $Q_1$ and by way of a second diode 300 to a transistor pair 332 comprising transistors $Q_2$ and $Q_3$. The input of the transistors is shunted by a capacitor 334 labeled $C_2$ and receives a power supply signal from a source (not shown) of positive potential by way of lead 336 and resistor 338. The output is connected to the power supply by way of additional resistors 340 and 342. A negative feedback lead 344 connects the emitter of $Q_1$ to the base of $Q_2$ and collector of $Q_3$.

The purpose of the one shot 92 is to tolerate a 33 percent change in power supply voltage without significantly affecting pulse width and to operate on less than 1.5 milliwatt of power. It can provide on the order of 99 percent duty cycle output and is not significantly affected by temperature variations over a $-40°$ to $+130°$ F. range. Once triggered, it is not affected by additional trigger pulses until after the timing cycle is completed and it triggers on only one input pulse polarity. Incoming pulses are differentiated by capacitor 324 and resistor 326 and are DC restored by diode 328. The peak of the input voltage must not be greater than the maximum voltage at the output (given by $$\frac{R_4 V_{cc+}}{R_3 R_4}\Big).$$

Initially transistors $Q_2$ and $Q_3$ are saturated, clamping points A and B essentially to ground. For this to occur, $$\frac{(V_{cc+})HFE_2}{R_2}\text{ sat.} \geq \frac{V_{cc+}}{R_3}$$

for practical purposes. When an input pulse is received, transistor $Q_1$ drives point A further toward ground, releasing the regeneration of $Q_2$ and $Q_3$. Point B switches to $$\frac{R_4 V_{cc+}}{R_3 + R_4}$$

$Q_1$ is then turned off and further trigger pulses will not be effective until the end of the timing cycle. Diode 330 assures that transistor $Q_1$ collector-base junction will not be forward biased and affect the timing. Capacitor 334 charges exponentially through resistor 338 toward $V_{cc}$. When the voltage at Point A reaches the voltage at Point B plus $VebQ_2$, $Q_2$ and $Q_3$ regenerate and clamp the output at essentially ground.

The timing of the circuit is given by the equation:

$$T = R_2 C_2 Ln \frac{V_{cc+} - VebQ_2 - V_{sat},Q_3}{V_{cc+} - \frac{R_4 V_{cc+}}{R_3 + R_4} - VebQ_2}$$

if $VerbQ_2$ and $V_{sat}. Q_3$ are small with respect to $V_{cc+}$ and (1)

if $VerbQ_2$ is small with respect to $V_{cc+}\left(1 - \frac{R_4}{R_3 + R_4}\right)$, (2)

the equation reduces to:

$$T = R_2 C_2 Ln \frac{V_{cc+}}{V_{cc+} \frac{(1-R_4)}{R_3+R_4}} \text{ pr. of } R_4 = R_3, \ T = R_2 C_2 Ln 2.$$

Hence, the timing is not dependent upon power supply changes or V*eb*, V*sat* changes providing conditions (1) and (2) are met.

Figure 21:
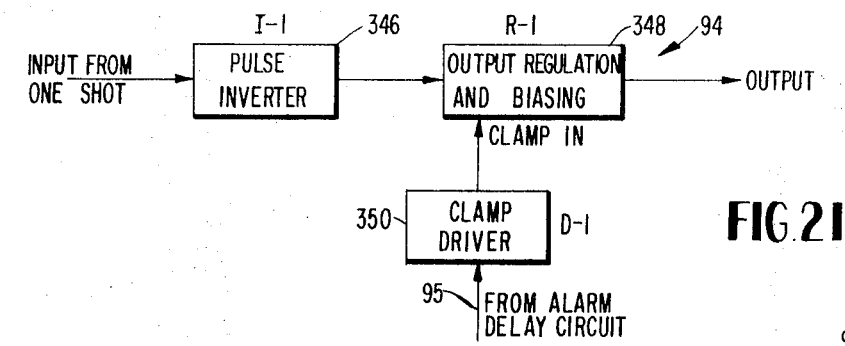

FIG. 21 is a diagram of the driver 94 of FIG. 1. It comprises a pulse inverter 346 receiving an input from the one shot 92 of FIG. 1 and supplying an output regulation and biasing circuit 348. This latter circuit is clamped from a clamp drive 350 receiving a signal by way of lead 95 from the alarm delay circuit 64 of FIG. 1. Pulse inverter 346 provides inversion of the one shot output pulse. Regulation and biasing circuit 348 regulates the pulse inverter output assuring constant amplitude output pulses to the rate circuit 98 of FIG. 1. Clamp driver 350 clamps the output of the circuit 348 to ground when fibrillation occurs and when the alarm delay circuit is enabled.

Figure 22:
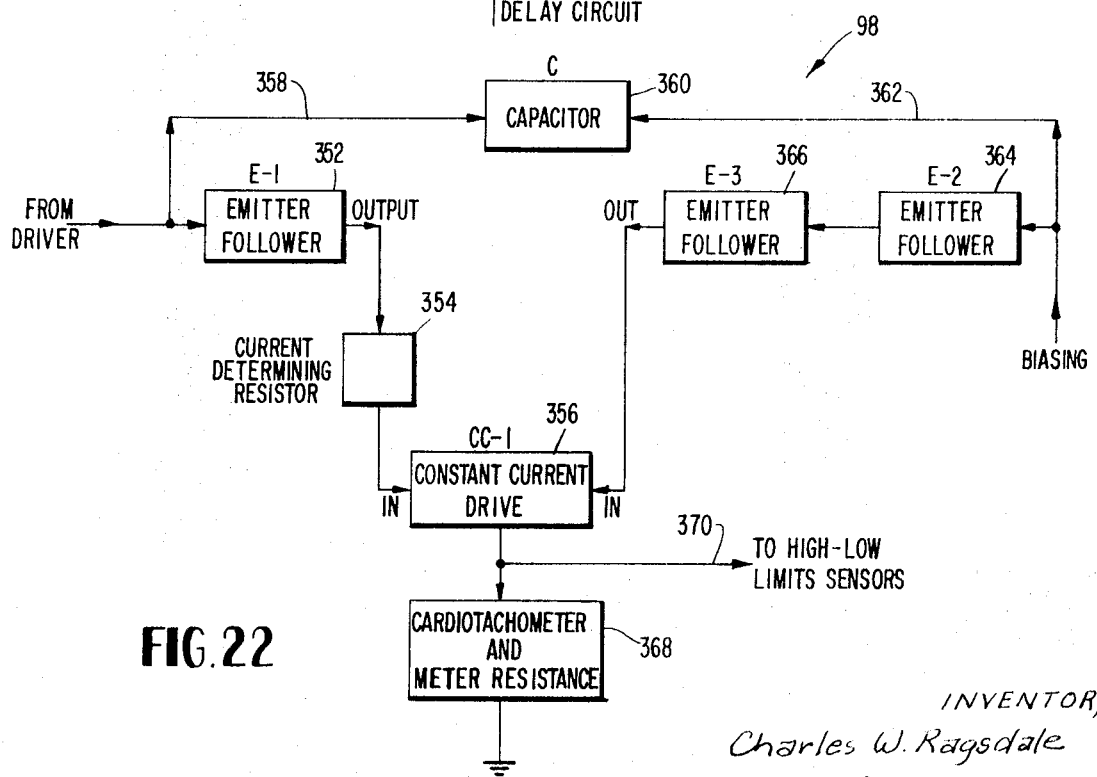

FIG. 22 is a diagram of the rate measuring circuit 98 of FIG. 1. The output from the driver 94 is supplied to an emitter follower 352 which passes a signal through a current determining resistor 354 to a current drive 356. The input signal is also fed by way of lead 358 to a capacitor 360. A biasing source (not shown) supplies a second signal by way of lead 362 to a capacitor 360. The biasing potential is also applied to constant current drive 356 through emitter followers 364 and 366. The constant current drive output is fed to a cardiotachometer and meter resistance circuit 368 including the cardiotachometer 100 of FIG. 1 and the output from the constant current driver 356 is also fed by way of lead 370 to the high-low limit sensors 102 and 104 of FIG. 1. Capacitor 360 applies essentially the same one shot pulse transient to emitter followers 352 and 364. Emitter follower 366 compensates for the input of constant current drive 356. Capacitor 360 charges up to a value dependent upon the average duty cycle of the one shot pulse. Because the pulse width is fixed, the capacitor 360 charges up to a value corresponding to the one shot repetition rate. Circuit output voltage is produced in the same manner as in the fibrillation duty cycle sensing circuit previously described. Drive 356 is not affected by the transients appearing equally at emitter followers 352 and 364 but gives an output dependent upon the voltage across capacitor 360. The cardiotachometer in circuit 368 reads the average rate.

Figure 23:
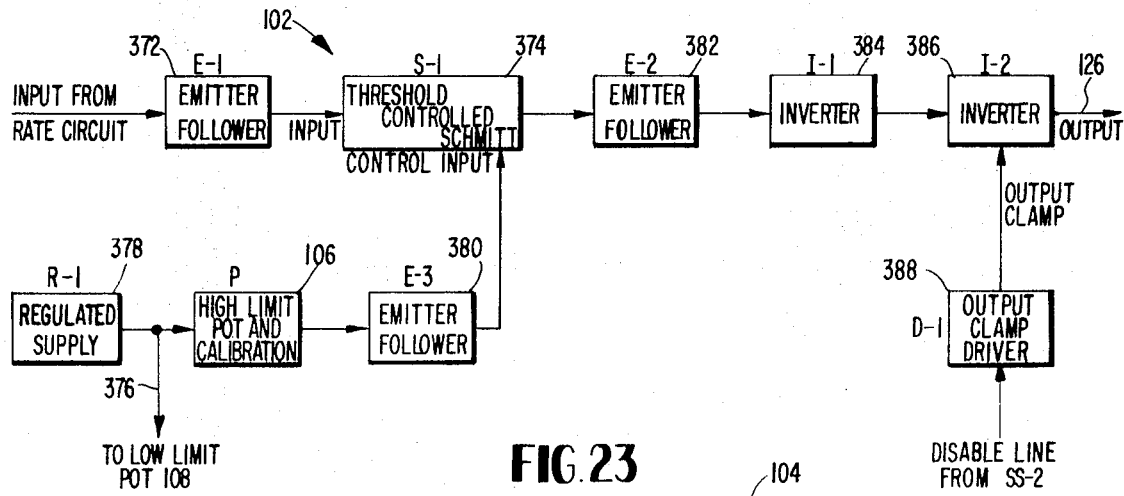

FIG. 23 is a block diagram of the high rate sensor 102 of FIG. 1. The high rate sensor comprises an input emitter follower 372 feeding threshold controlled schmitt 374. The low limit potentiometer 108 of FIG. 1 is connected by lead 376 to the output of a regulated supply 378 which also feeds the high limit potentiometer and calibration resistor 106. The high limit potentiometer 106 is connected through emitter follower 380 to the control input of threshold controlled schmitt 374. The output of schmitt 374 is connected through an emitter follower 382 and a pair of inverters 384 and 386 to output lead 126. The disable line from standstill circuit 112 of FIG. 1 is connected through output clamp driver 388 to the output clamp terminal of the second inverter 386. Emitter follower 372 compensates for the input of threshold controlled schmitt 374. Emitter follower 380 compensates for the voltage drop across the diode used in the control input of the schmitt. The regulated supply 378 which is temperature compensated supplies a regulated voltage to the high limit potentiometer 106 which in turn supplies voltage to emitter follower 380 depending on the rate limit setting, which voltage sets the threshold of schmitt 374. Thus, if the rate sensor input exceeds the schmitt threshold (high rate limit), schmitt 374 changes state. Emitter follower 382 and the two inverters reduce the loading on the schmitt and supply the proper output polarity. Driver 388 clamps the sensor output when the standstill circuit 112 of FIG. 1 is enabled.

Figure 24:
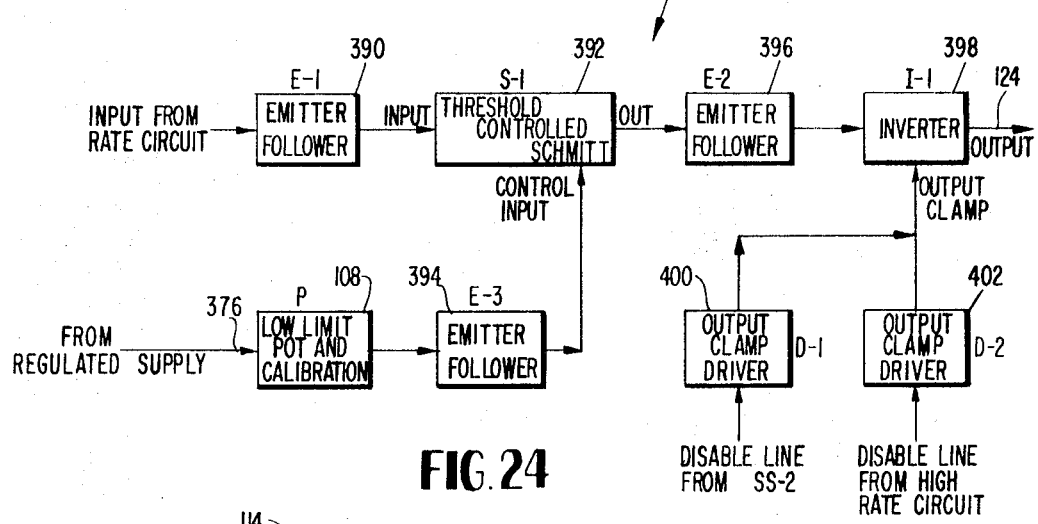

FIG. 24 is a block diagram of the low rate sensor 104 of FIG. 1. This circuit comprises an input emitter follower 390 feeding a threshold controlled schmitt 392. The regulated supply 378 of FIG. 23 feeds a signal by a line 376 to the low limit potentiometer and calibration resistor 108 which has its output coupled to the control input of the schmitt 392 of FIG. 24 by way of emitter follower 394. The schmitt output is connected through an emitter follower 396 and a single inverter 398 to output lead 124. The inverter output is clamped from the standstill circuit through output clamp driver 400 and from the high rate circuit through output clamp driver 402. The circuit of FIG. 24 for the low rate sensor operates the same as the high rate sensor described in conjunction with FIG. 23 with the exception of the omission of the second inverter at the output and the addition of a second output clamp. The clamps 400 and 402 clamp the sensor output when the appropriate disable signals are received.

Figure 25:
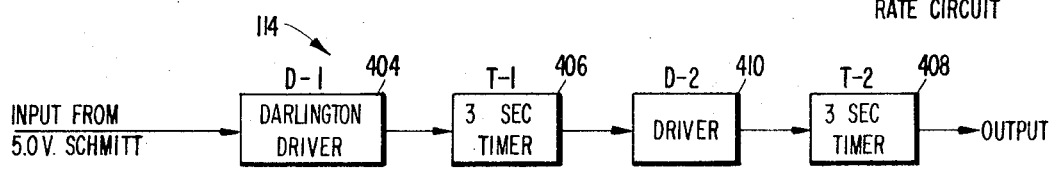

FIG. 25 is a block diagram of the standstill circuit 114 labeled SS-1 in FIG. 1. This circuit comprises a darlington driver 404 receiving an input from the 5.0 volt schmitt. The driver is coupled to a 3 second timer 406. The output of timer 406 feeds a second 3 second timer 408 through a driver 410. Darlington driver 404 resets timer 406 and maintains the reset as long as the input to the driver is received. When the first timer 406 is reset, this timer output acts through the second driver 410 to release the second timer 408. If the release of timer 408 is maintained, the output of this timer will change state 3 seconds later, meaning a nonarrest condition. The first timer 406 can be maintained in a reset condition as long as the standstill circuit input pulses occur more frequently than once every 3 seconds (20 beats per minute). If the input pulses to the standstill circuit 114 occur less frequently than once every 3 seconds, the output of timer 406 changes state and resets the second timer 408. Resetting timer 408 causes the standstill circuit output to change state indicating cardiac arrest.

Figure 26:
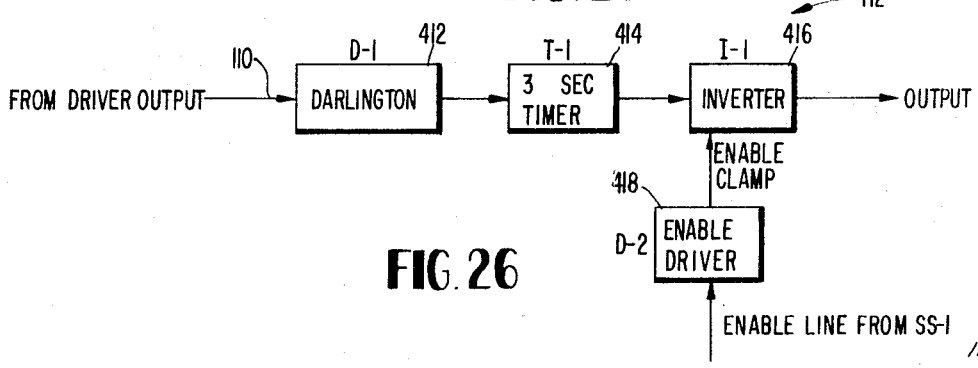

FIG. 26 is a block diagram of a second standstill circuit 112 labeled SS-2 in FIG. 1. This circuit comprises an input darlington 412 connected to a 3 second timer 414 feeding an output inverter 416. The input to darlington 412 is from the output of driver 94 in FIG. 1 by way of lead 110. Circuit 112 is also connected to the enable line from standstill 114 of FIG. 1 through an enable driver 418 connected to the enable clamp terminal of output inverter 416. When the one shot 192 of FIG. 1 emits a pulse through the driver 94, the 3 second timer 414 of FIG. 26 is held reset through darlington circuit 412. When timer 414 is reset, the timer output acts through inverter 416 to produce a disabled condition output pulse. At the end of the one shot pulse, a 3 second period determined by timer 414 exists during which the standstill circuit remains disabled. If a pulse is not received during the 3 second interval, the output switches to the alarm state (enabled). The output can also be maintained in the enabled state through driver 418 if standstill 114 of FIG. 1 is enabled.

FIG. 27 is a block diagram of the alarm gating circuit 118 of FIG. 1. This circuit comprises a plurality of gates indicated generally at 420 labeled G-1 through G-9. The gates are connected in pairs through a biasing circuit 422 and meter position sensing resistors 424, the latter in turn connected to a regulated supply 426. Gate G-5 is connected singly to line 120 from standstill circuit 114 of FIG. 1. Gates G-1 and G-6 are connected to line 128 from the alarm delay circuit 64 of FIG. 1, gates G-2 and G-7 are connected to line 124 from the low rate sensor, gates G-3 and G-8 to line 126 from the high rate sensor, and gates G-4 and G-9 to line 122 from the standstill circuit 112 of FIG. 1. An output to the battery-electrode test switches and indicator meter 18 and 22, respectively, of FIG. 1 is taken from the alarm gating circuit 118 by way of lead 130 connected to the meter position sensing resistors 424 and an output to the beeper gate 96 and to the alarm generator 134 of FIG. 1 is taken from the biasing circuit 422 by way of lead 428.

When the appropriate signals are received at the gate input, gates 1 through 5 act through the meter position biasing resistors 424 and supplied by the temperature compensated regulated supply to supply the correct position voltage to the indicator meter. Concurrently, the proper one of the remaining gates (G-6—G-9) operates to change the state at the gating output. The output enables the alarm generator and disables the beeper gate.

FIG. 28 is a circuit diagram of the beeper gate 96 of FIG. 1. The beeper gate comprises a darlington biasing network 430 receiving a signal by way of line 142 from the one shot 92 of FIG. 1 Darlington biasing network 430 is clamped through a clamping gate 432 from the alarm gating circuit 118 by way of lead 136. The darlington biasing network 430 supplies a signal to a darlington circuit 434 feeding the beeper volume control 144 of FIG. 1. If a disable signal is not present at A in FIG. 28, the one shot signal at B acts through network 430 and darlington 434 to supply a beeper signal to the alarm through the beeper volume control potentiometer. If a disable signal is present at A, clamp gate 432 acts to disable the beeper gate.

FIG. 29 is a block diagram of the alarm generator 134 of FIG. 1. This circuit comprises an input driver 436, a 10 second timer 438, a second driver 440, and a 2 second timer 442. When an alarm condition voltage is received from the gating driver 436, it starts 10 second timer 438 unless timer 438 is already started. When timer 438 starts, 2 second timer 442 is also triggered through driver 440, giving an alarm output for 2 seconds. After 10 second timer 438 is started, changes in the gating output signal will not affect the timing of this timer. If an alarm condition voltage continuously remains at the input of driver 436, the 10 second timer free runs, triggering a 2 second alarm output from timer 442 every 10 seconds.

FIG. 30 is a block diagram of the low battery circuit 146 of FIG. 1. This circuit comprises a minus battery level sensor 444 and emitter follower 446, a trigger driver 448, a positive battery level sensor 450, and a second emitter follower 452. Minus battery level sensor 444 enables when the minus battery voltage drops below 9.1 volts. After triggering, the circuit must be disconnected and then reconnected to a greater than 9.1 volt negative battery voltage to reset. Sensor 444 acts through emitter follower 446 and trigger driver 448 to enable positive battery level sensor 450, giving an alarm condition output through emitter follower 452. With minus battery sensor 444 disabled, if the positive battery voltage drops below 9.1 volts, positive battery level sensor 450 enables. An alarm output is then given through emitter follower 452. Sensor 450 must also be reset by disconnecting from the battery supply and reconnecting to a positive voltage supply greater than 9.1 volts.

FIG. 31 shows the alarm OR gate 138 of FIG. 1. This circuit comprises a first gate 454 receiving a signal from the alarm generator circuit and a second darlington gate 456 receiving a signal from the low battery circuit of FIG. 30. In FIG. 31, if any input is received at A or B, the alarm is sounded at full volume.

It is apparent from the above that the present invention provides a fully electronic heart monitor which meets all military environment standards by operating over an extensive temperature range of from −40° to +130° F. and one which is of small size and lightweight, particularly adapted for field use where oscilloscopes and trained personnel may not be readily available. An important feature of the present invention includes the indication of ventricular fibrillation when present. In addition, the monitor permits operation when a great deal of noise is present and gives an indication of excessive noise which might occur from an open lead. The meter of the monitor indicates high rate, low rate, noise present, arrest, i.e., standstill below 20 beats per minute, and ventricular fibrillation. It provides an electrode-battery test feature and automatically sounds a continuous tone alarm if either of the two batteries need recharging. It is capable of operating continuously from six to seven days and provides beeps at an adjustable volume with each nonalarm state heart rate.

What is claimed and desired to be secured by U.S. Letters Patent is.

I claim

1. A heart monitor comprising input terminals for coupling said monitor to a source of electrocardiogram waves, an alarm, and a fibrillation sensing circuit coupling said input terminals to said alarm whereby said alarm is actuated by said sensing circuit when a fibrillation waveform is applied to said input terminals, said fibrillation sensing circuit comprising means for sensing the duty cycle of an electrocardiogram wave extending beyond predetermined maximum and minimum values.

2. A heart monitor comprising input terminals for coupling said monitor to a source of electrocardiogram waves, a meter, rate sensing means coupling said input terminals to said meter whereby said meter indicates the average heart rate, an alarm, second means coupling said input terminals to said alarm for actuating said alarm in response to an abnormal waveform applied to said input terminals, and a fibrillation sensing circuit coupling said input terminals to said alarm whereby said alarm is actuated by said sensing circuit when a fibrillation waveform is applied to said input terminals, said fibrillation sensing circuit comprising means for sensing the duty cycle of an electrocardiogram wave extending beyond predetermined maximum and minimum values.

3. A heart monitor according to claim 2 wherein said second coupling means includes means for sensing a waveform evidencing a heart rate outside a predetermined normal range.

4. A heart monitor according to claim 2 wherein said second coupling means includes means for sensing a waveform evidencing heart standstill.

5. A heart monitor according to claim 2 wherein said second coupling means comprises means for sensing excessive noise at said input terminals.

6. A hear monitor according to claim 2 wherein said second coupling means includes means for sensing a drop in power supply potential below a predetermined level.

7. A heart monitor comprising input terminals for coupling said monitor to a source of electrocardiogram waves, a meter, rate sensing means coupling said terminals to said meter whereby said meter indicates average heart rate, an alarm, high and low rate sensors coupling said rate sensing means to said alarm whereby said alarm is actuated when the heart rate goes beyond a predetermined range, and a fibrillation sensor coupling said input terminals to said alarm whereby said alarm is actuated when the waveform applied to said input terminals evidences ventricular fibrillation, said fibrillation sensor comprising means for sensing the duty cycle of an electrocardiogram wave extending beyond predetermined maximum and minimum values.

8. A hear monitor according to claim 7 including a digital filter coupling said input terminals to said rate sensing means.

9. A hear monitor according to claim 8 including a rectifier and trigger circuit coupling said input terminals to said digital filter.

10. A heart monitor according to claim 7 including means coupling said input terminals to said alarm for pulsing said alarm at a rate indicative of a normal heart rate as indicated by said meter.

11. A heart monitor according to claim 10 including a manually adjustable control coupled to said alarm for controlling the amplitude of the signal from said alarm.